US012327933B2

(12) United States Patent
Samardzija et al.

(10) Patent No.: US 12,327,933 B2
(45) Date of Patent: Jun. 10, 2025

(54) ANTENNA WITH UNIFORM RADIATION FOR ULTRA-WIDE BANDWIDTH

(71) Applicant: PLUME DESIGN, INC., Palo Alto, CA (US)

(72) Inventors: Miroslav Samardzija, Mountain View, CA (US); Arthur Tung, San Jose, CA (US); Brian Nam, San Jose, CA (US); Liem Hieu Dinh Vo, San Jose, CA (US); William J. McFarland, Portola Valley, CA (US)

(73) Assignee: PLUME DESIGN, INC., Palo Alto, CA (US)

( * ) Notice: Subject to any disclaimer, the term of this patent is extended or adjusted under 35 U.S.C. 154(b) by 319 days.

(21) Appl. No.: 18/297,327

(22) Filed: Apr. 7, 2023

(65) Prior Publication Data

US 2023/0246340 A1 Aug. 3, 2023

Related U.S. Application Data

(62) Division of application No. 17/034,291, filed on Sep. 28, 2020, now Pat. No. 11,652,295.

(51) Int. Cl.

| | |
|---|---|
| ***H01Q 9/04*** | (2006.01) |
| ***H01Q 1/38*** | (2006.01) |
| ***H01Q 1/48*** | (2006.01) |
| ***H01Q 13/16*** | (2006.01) |

(52) U.S. Cl.
CPC ............ *H01Q 9/0421* (2013.01); *H01Q 1/38* (2013.01); *H01Q 1/48* (2013.01); *H01Q 13/16* (2013.01)

(58) Field of Classification Search
CPC ........ H01Q 9/0421; H01Q 1/36; H01Q 13/16; H01Q 1/48; H01Q 1/38; H01Q 5/25; H01Q 9/42
See application file for complete search history.

(56) References Cited

U.S. PATENT DOCUMENTS 6,950,068 B2 * 9/2005 Bordi .................. H01Q 9/0421 343/702
2007/0069959 A1 * 3/2007 Wu ...................... H01Q 9/0442 343/702

* cited by examiner

*Primary Examiner* — Dameon E Levi
*Assistant Examiner* — Aladdin Abdulbaki
(74) *Attorney, Agent, or Firm* — Nicholas Martin; Greenberg Traurig, LLP

(57) ABSTRACT

An antenna element includes an outer conductor and an inner conductor. The outer conductor forms a perimeter of the antenna element. The inner conductor is physically and electrically connected to the outer conductor only at an intermediate connection at an inner portion of the outer conductor. The outer conductor and the inner conductor are arranged to form a slot therebetween. The slot extends around the inner conductor such that each end of the slot is adjacent to the intermediate connection.

20 Claims, 8 Drawing Sheets

ANTENNA WITH UNIFORM RADIATION FOR ULTRA-WIDE BANDWIDTH

CROSS-REFERENCE TO RELATED APPLICATIONS

This application is a divisional application of and claims priority to U.S. patent Ser. No. 17/034,291, filed Sep. 28, 2020, which is incorporated in its entirety herein by reference.

FIELD OF THE DISCLOSURE

The present disclosure generally relates to antennas. More particularly, the present disclosure relates to systems and methods for antennas with a uniform radiation pattern for Ultra-Wide Bandwidth ("UWB").

BACKGROUND OF THE DISCLOSURE

Ultra-Wide Bandwidth ("UWB") technology can be used effectively for determining a distance between two devices, often referred to as ranging, by measuring a time it takes for the pulse to travel directly between the devices. As the speed of the pulse is known, the distance can be calculated by multiplying the speed and the measured time.

However, there are limitations to the UWB ranging. First, UWB ranging requires a direct path for the pulse sent between the two devices as a distance calculated for an indirect path would give a length of the indirect path rather than a distance between the devices. Second, the angular position between the two devices is typically unknown (although this can be determined using multiple antennas).

Due to the above limitations of UWB ranging, a non-uniform radiation pattern of an antenna used for UWB can significantly affect the efficacy of a UWB device. FIG. 1 is a schematic illustration of a first UWB device 10, positioned relative to a second UWB device 20 and a third UWB device 40, with a polar plot 50 illustrating a typical radiation pattern 51 relative to the first antenna 11 of the first UWB device 10.

As shown in FIG. 1, the typical radiation pattern 51 of the first antenna is non-uniform at varying angular positions relative to the first UWB device 10. In typical wireless products, there is a desire for a low profile, small, and internally positioned antennas. Often, Inverted F Antennas (IFAs) and Planar Inverted F Antennas (PIFAs) are used and positioned within the wireless product/device. The shape and positioning of the IFAs/PIFAs can degrade the uniformity of the radiation pattern 51, such that there is a significant delta between a maximum radiation 52 at a first angular position and a minimum radiation 53 and a second angular position. In the example shown in FIG. 1, there is approximately 20 dB (decibel) difference between the maximum radiation 52 and the minimum radiation 53. Since antennas are reciprocal in nature, the same is true for the maximum and the minimum in a receive sensitivity pattern.

As a result of this non-uniformity in the antenna signal strength at certain angular positions, some devices (positioned at similar distances from the first UWB device 10) will effectively communicate with the first device 10, while others cannot. For example, UWB device 20 is at an angular position at or near where the maximum radiation 52 of the first antenna 11 occurs and UWB device 30 is at an angular position at or near where the minimum radiation 53 of the first antenna 11 occurs. Thus, the pulse 22 sent by the second antenna 21 is easily received by the first antenna 11, while the pulse 32 of the third antenna 31 might not be received by the first antenna 11 as the minimum radiation 53 may be below the receive sensitivity of the first device 10.

While non-uniformity does not critically affect other wireless technologies, such as cellular and Wi-Fi due to the leveraging of multi-path propagation, as discussed above, UWB ranging requires a direct path to accurately determine a distance between two devices. FIG. 2 is a schematic illustration of a first UWB device 10, positioned relative to a second UWB device 20 and a third UWB device 40, with a polar plot 60 illustrating an optimal radiation pattern 61 relative to the first antenna 11 of the first UWB device 10. As such, antennas with more uniform radiation patterns, particularly for UWB applications, are desirable. As can be seen in FIG. 2, by maintaining uniformity in the radiation pattern of the antenna 11 of the first UWB device 10, the angular positions of the second UWB device 20 and the third UWB device 30 do not matter with regards to whether the pulses 22 and 32 will be received by the first UWB device 10.

BRIEF SUMMARY OF THE DISCLOSURE

In an embodiment, an antenna element is disclosed. The antenna element includes an outer conductor and an inner conductor. The outer conductor forms a perimeter of the antenna element. The inner conductor is physically and electrically connected to the outer conductor only at an intermediate connection at an inner portion of the outer conductor. The outer conductor and the inner conductor are arranged to form a slot therebetween. The slot extends around the inner conductor such that each end of the slot is adjacent to the intermediate connection.

In embodiments, the inner conductor includes a feed point adapted to receive an electrical connection distal to the intermediate connection. In some embodiments, the perimeter of the outer conductor includes a cylindrical shape. In some embodiments, the perimeter of the cylindrical shape is within ten percent of half of a wavelength that the antenna element is adapted to receive. In some embodiments, the slot meanders on each side of the inner conductor such that the slot includes a length that is within ten percent of half of a wavelength that the antenna element is adapted to receive.

In embodiments, the antenna element further includes a planar portion that at least forms the perimeter of the antenna element, and a protruding section that protrudes from the planar portion. Optionally, the protruding section includes a dome shape, the inner conductor includes a feed point adapted to receive an electrical connection distal to the intermediate connection, and the intermediate portion is adapted to be angled towards a ground plane due to the dome shape of the protruding section.

In another embodiment, a slotted patch antenna is disclosed. The slotted patch antenna includes an antenna element and short walls. The antenna element includes an outer conductor and an inner conductor. The outer conductor forms a perimeter of the antenna element. The inner conductor is physically and electrically connected to the outer conductor only at an intermediate connection at an inner portion of the outer conductor. The inner conductor is adapted to approximate an electric monopole. The outer conductor and the inner conductor are arranged to form a slot therebetween. The outer conductor and the inner conductor are adapted to generate a voltage across the slot that approximates a magnetic dipole that is orthogonal to the approximated electric monopole. The short walls are adapted to physically and electrically connect the antenna element to a ground plane. Each short wall connects to an end of the outer conductor on a side of the antenna element opposite to the intermediate connection.

In embodiments, the inner conductor includes a feed point adapted to receive an electrical connection distal to the intermediate connection, the feed point being between the ends of the outer conductor, and the electric monopole is approximated by an electric current flowing from the feed point to the intermediate connection. Optionally, the electric monopole is further approximated by an electric current flowing along the perimeter of the outer conductor from the short walls towards the intermediate connector. Optionally, the magnetic dipole is approximated by the voltage across the slot resulting from the electric current flowing along the perimeter of the outer conductor from the short walls towards the intermediate connector, which is also flowing along the slot, and the electric current flowing across the intermediate connector and along the slot on the inner conductor towards the feed point.

In embodiments, the perimeter of the cylindrical shape is within ten percent of half of a wavelength that the antenna element is adapted to receive, and the slot meanders on each side of the inner conductor such that the slot includes a length that is within ten percent of half of the wavelength that the antenna element is adapted to receive.

In embodiments, the antenna element further includes a planar portion that at least forms the perimeter of the antenna element, and a protruding section that protrudes from the planar portion. Optionally, the protruding section includes a dome shape, the inner conductor includes a feed point adapted to receive an electrical connection distal to the intermediate connection, and the intermediate connection is adapted to be angled towards a ground plane due to the dome shape of the protruding section.

In a further embodiment, an antenna system is disclosed. The antenna system includes an antenna element, a mounting bracket, and short walls. The antenna element includes an outer conductor and an inner conductor. The outer conductor forms a perimeter of the antenna element. The inner conductor is physically and electrically connected to the outer conductor only at an intermediate connection at an inner portion of the outer conductor. The inner conductor extends from the intermediate connection to a feed point adapted to receive an electrical connection distal to the intermediate connection. The outer conductor and the inner conductor are arranged to form a slot therebetween. The slot extends around the inner conductor such that each end of the slot is adjacent to the intermediate connection. The mounting bracket is adapted to be a ground plane. The short walls physically and electrically connect the outer conductor to the mounting bracket. Each short wall connects to an end of the outer conductor adjacent to the feed point.

In embodiments, the inner conductor is adapted to approximate an electric monopole, and the outer conductor and the inner conductor are adapted to generate a voltage across the slot that approximates a magnetic dipole that is orthogonal to the approximated electric monopole.

In embodiments, the antenna element, including the outer conductor and the inner conductor, the short walls, and the mounting bracket are formed of a unitary structure by one of stamping and casting.

In embodiments, the antenna system further includes a second antenna element physically and electrically connected to the mounting bracket by the second short walls. Optionally, wherein the antenna element, the short walls, the mounting bracket and the second antenna element form a unitary structure by one of stamping and casting.

In embodiments, the antenna element further includes a planar portion and a protruding section. The planar portion at least forms the perimeter of the antenna element. The protruding section protrudes from the planar portion. The feed point is adapted to be angled towards a ground plane due to the shape of the protruding section.

In embodiments, the antenna element is planar and printed on a Printed Circuit Board (PCB). Optionally, the slot and the perimeter are defined by printed shapes on the surface of the PCB. Optionally, the short walls are vias extending through the PCB to a ground.

In embodiments, the antenna system includes a plurality of the antenna element positioned within a device with known distances and angles therebetween for finding relative phases and angles of incoming signals from other devices.

In embodiments, the antenna element is printed using metalized plastic on a carrier, and wherein the antenna element and the carrier are mounted as a unit to a device.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various embodiments, the present disclosure relates to systems and methods for generating a uniform radiation pattern with a slotted patch antenna. The slotted patch antenna includes vertical short walls that position the slotted patch antenna above the ground plane and mechanically support the antenna element. The antenna element includes a long slot that separates an outer conducting element from an inner conducting element except at an intermediate connection between the outer and inner conducting elements that is distal to a feed point on the inner conductor. The outer and inner conducting elements and the slot therebetween are adapted to generate two complementary radiation sources that are orthogonal to each other such that the two radiation sources compensate for dips in the radiation pattern of the other radiation source, which results in a more uniform overall radiation pattern of the slotted patch antenna.

Figure 1:
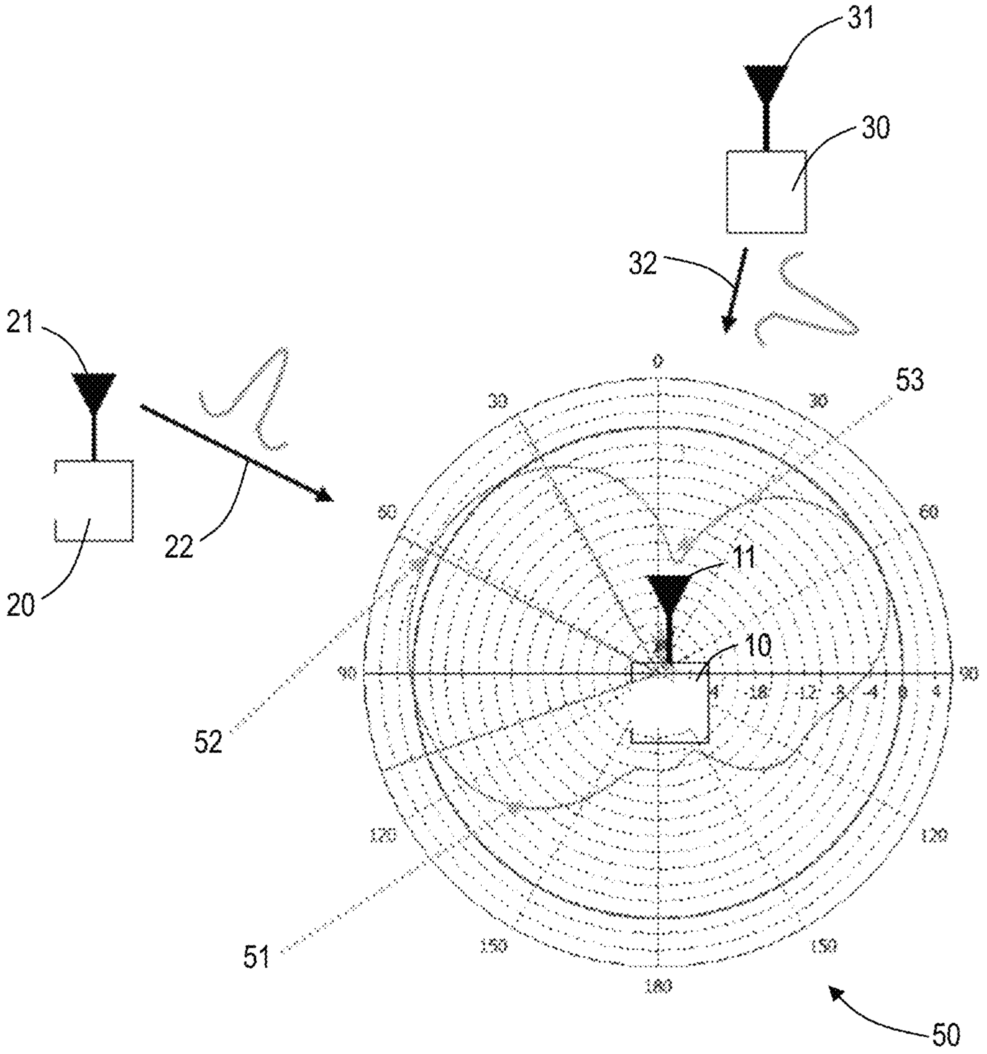
FIG. 1 is a schematic illustration of a first UWB device, positioned relative to a second UWB device and a third UWB device, with a polar plot illustrating a typical radiation pattern relative to the first antenna of the first UWB device.
Figure 2:
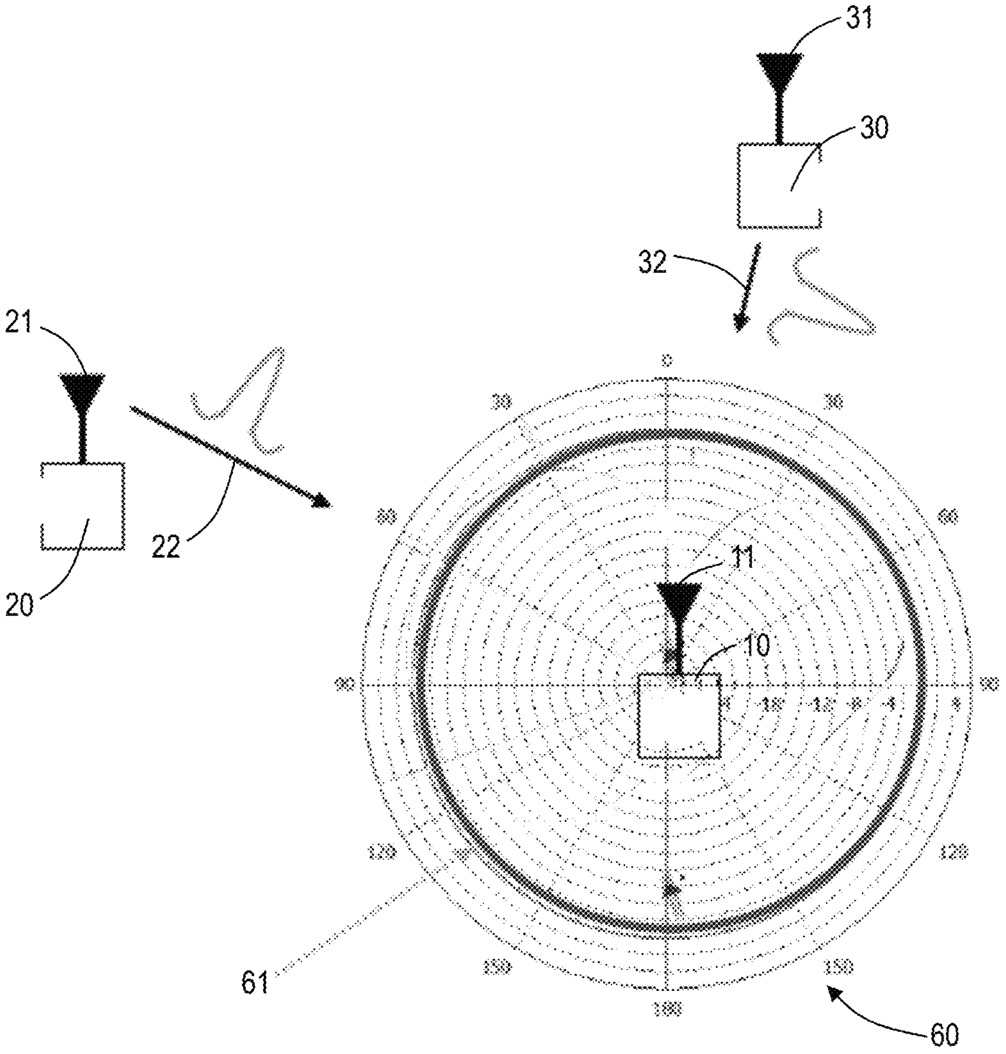
FIG. 2 is a schematic illustration of a first UWB device, positioned relative to a second UWB device and a third UWB device, with a polar plot illustrating an optimal radiation pattern relative to the first antenna of the first UWB device.
Figure 3:
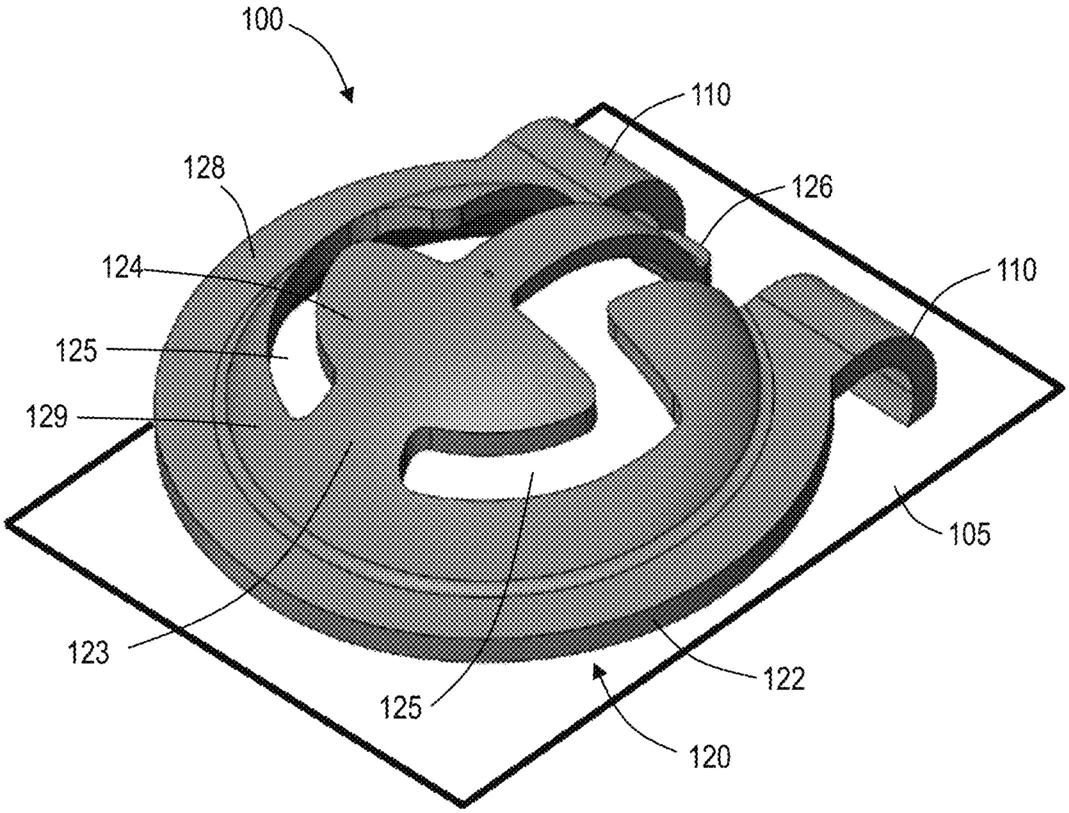
FIG. 3 is a perspective diagram of a slotted patch antenna.
Figure 4:
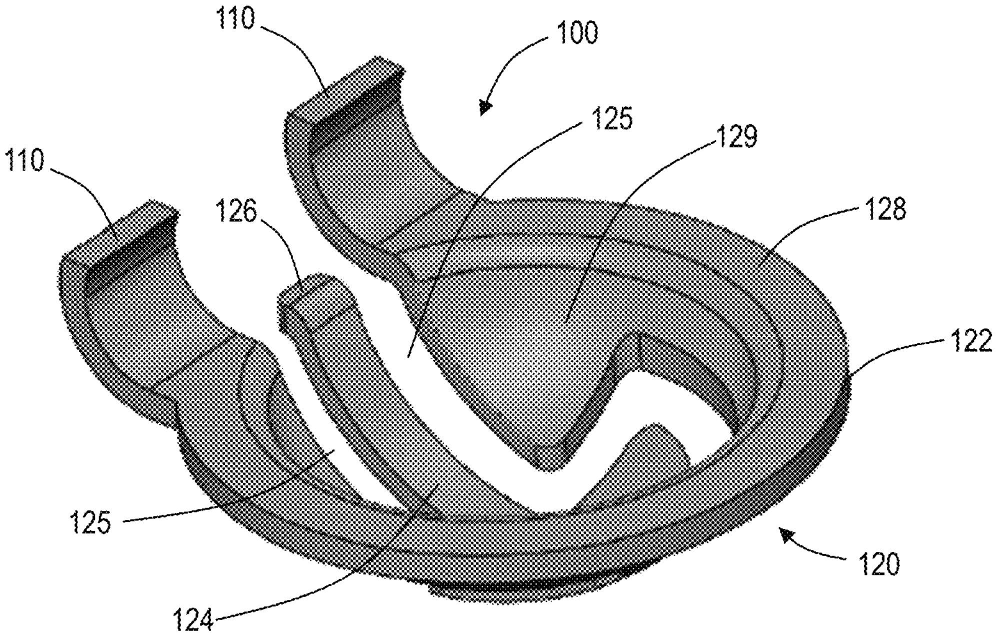
FIG. 4 is a perspective diagram of the slotted patch antenna of FIG. 3 from an alternate view.
Figure 5:
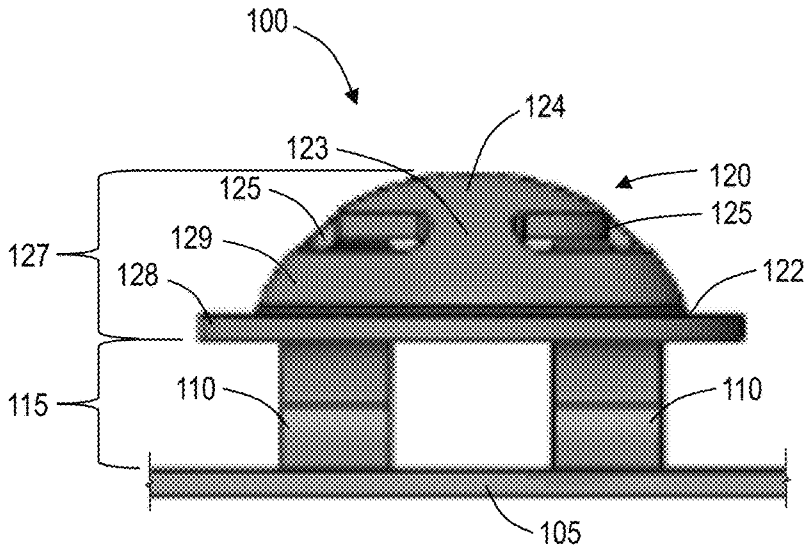
FIG. 5 is a side perspective diagram of the slotted patch antenna of FIGS. 3-4.
Figure 6:
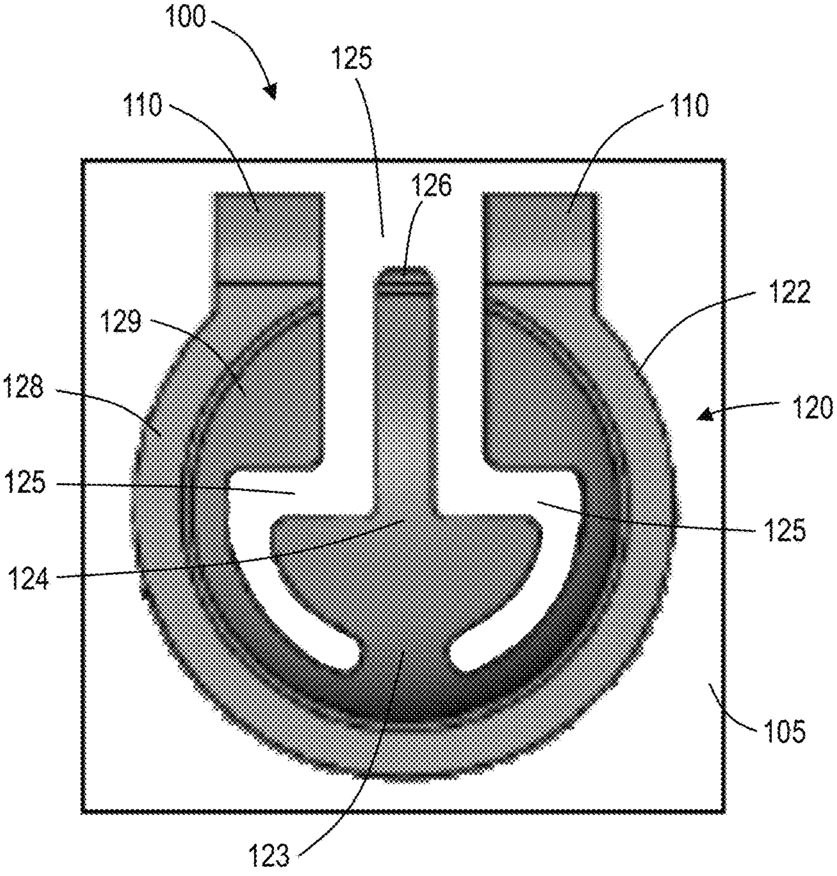
FIG. 6 is a top perspective diagram of the slotted patch antenna of FIGS. 3-5.

FIG. 3 is a perspective diagram of a slotted patch antenna 100. FIG. 4 is a perspective diagram of the slotted patch antenna 100 of FIG. 3 from an alternate view. FIG. 5 is a side perspective diagram of the slotted patch antenna 100 of FIGS. 3-4. FIG. 6 is a top perspective diagram of the slotted patch antenna 100 of FIGS. 3-5. Referring to FIGS. 3-6, the slotted patch antenna 100 includes short walls 110 and an antenna element 120. The short walls 110 are adapted to physically and electronically connect the antenna element 120 to a ground plane 105 and are adapted to act as vertical grounding walls/pins. The short walls 110 provide matching vias adding shunt inductance to the ground. As shown in FIG. 4, the short walls 110 are adapted to maintain a gap 115 between the antenna element 120 and the ground plane 105. In embodiments, the short walls 110 are adapted such that the gap 115 is smaller than at least one of a length, width, and height of the antenna element 120 so that the slotted patch antenna 100 has a low profile relative to the ground plane 105. In the embodiment illustrated, the slotted patch antenna 100 includes two short walls 110 positioned on the same side of the antenna element 120 and are spaced apart. In some embodiments, the gap 115 is from 1-2 millimeters.

In some embodiments, the short walls 110 are vias that extend through a Printed Circuit Board ("PCB") to the ground plane 105 at the bottom of the PCB, allowing the antenna element 120 to rest on the dielectric material.

The antenna element 120 includes an outer conductor 122, an inner conductor 124, and a slot 125. The outer conductor 122 is adapted to form a perimeter of the antenna element 120 (this length is the fully enclosed perimeter, including across the slot, between the short walls 110). In embodiments, the perimeter has a length of approximately half of the wavelength that the antenna element 120 is configured to receive.

In some embodiments, the perimeter of the antenna element 120 is within ten percent of the wavelength from half of the wavelength, such as from forty percent to 60 percent of the wavelength. For example, a UWB channel is centered at 6.5 GHz, where the wavelength in free space is approximately 46 millimeters. In these embodiments, the perimeter is within ten percent of half of 46 millimeters, or in other words, within plus or minus 4.6 millimeters of 23 millimeters. In one embodiment, the perimeter is 27 millimeters.

In some embodiments, the perimeter is within 5 millimeters of half of the wavelength. In the embodiment illustrated, the perimeter includes a circular shape, such as a cylindrical shape. In some embodiments, the cylindrical shape includes a radius from 3 millimeters to 4.5 millimeters.

The outer conductor 122 connects to the short walls 110. In embodiments, the outer conductor 122 includes two adjacent ends on the same side of the antenna element 120, each connected to a short wall 110. The outer conductor 122 then extends around the inner conductor 124, forming the perimeter of the antenna element, while maintaining a gap directly between the two adjacent ends. In embodiments with the circular/cylindrical shape, the circular/cylindrical shape is formed with an opening opposite the intermediate connection 123.

The inner conductor 124 physically and electrically connects to the outer conductor 122 at an intermediate connection 123 that is at an inner portion of the outer conductor 122 and a side of the antenna element 120 opposite the short walls 110. The inner conductor 124 extends from the intermediate connection 123 generally toward the short walls to a feed point 126 that is proximal to the short walls 110 and distal to the intermediate connection 123. In embodiments, the feed point 126 is positioned between the ends of the outer conductor 122 that are connected to the short walls 110. In embodiments with the circular/cylindrical shape, the feed point 126 is positioned between the ends defining the opening therein.

The inner conductor 124 and the outer conductor 122 are adapted to form a slot 125 therebetween. Referring to FIG. 6, the ends of the slot 125 are each adjacent to the intermediate connection 123, and the slot 125 extends from one end of the slot 125, along the inner conductor 124, around the feed point 126, and back along the inner conductor 124 to the other end of the slot 125. While the slot 125 appears to be open between the ends of the outer conductor 122 and the short walls 110, the slot 125 can be considered enclosed by short walls 110 and the ground plane 105 at that end of the antenna element 120, which provides continuity of conductive material, such as metal, around the entire slot structure.

In embodiments, the slot 125 meanders to increase a length of the slot 125, such that each half of the slot, extending along each side of the inner conductor 124, has a length longer than at least one of a length and a width of the antenna element 120. In the embodiment illustrated, each half of the slot 125 is longer than a diameter of the cylindrical shape of the perimeter of the outer conductor 122. In some embodiments, the length of the slot 125, measured from one end of the slot 125 adjacent to the intermediate connection around the inner conductor to the other end of the slot 125 adjacent to the intermediate connection 123, is approximately half of the wavelength that the antenna element 120 is configured to receive.

In some embodiments, the length of the slot 125 of the antenna element 120 is within ten percent of the wavelength from half of the wavelength, such as from forty percent to 60 percent of the wavelength. For example, a UWB channel is centered at 6.5 GHz, where the wavelength in free space is approximately 46 millimeters. In these embodiments, the length of the slot 125 is within ten percent of half of 46 millimeters, or in other words, within plus or minus 4.6 millimeters of 23 millimeters. In one embodiment, the length of the slot is 20 millimeters. In some embodiments, the length of the slot 125 is within 5 millimeters of half the wavelength.

In embodiments, the meandering path is in the form of one or more curves that benefit the radiation pattern. In the embodiment illustrated, the slot 125 is symmetrical, with each half of the slot 125 circumferentially diverging from the intermediate connection 123 before converging towards the other half of the slot 125, after which each half of the slot 125 extends parallel to the other towards the feed point 126 and the short walls 110. This meandering results in an inner conductor with a thicker, semicircular/wedge-like shape adjoining the intermediate connection with a stem-like shape extending therefrom and to the feed point 126. As discussed in greater detail below, the meandering slot 125 produces an approximate of a magnetic dipole that is orthogonal to an approximate electric monopole produced by the antenna element 120.

A width of the slot 125 is selected to control a voltage across the slot 125. In embodiments, a width of the slot 125 is less than a width of the portion of the inner conductor 124 with the stem-like shape. In embodiments, the slot 125 is narrow relative to the length and width of the antenna element 120. In some embodiments, the slot is approximately 1 millimeter, such as within a predetermined tolerance of 1 millimeter. However, other widths are also contemplated. As the slot 125 is relatively narrow, the bandwidth resulting therefrom is sufficient, the mechanical integrity of the antenna element 120 is maintained, and the resulting volume of the antenna element 120 is minimized.

The antenna element 120 includes a plate-like shape. In embodiments, the plate-like shape is one of a flat plate and a planar portion 128 with a protruding section 129 therein. In some embodiments, the protruding section 129 raises away from the ground plane 105, and in other embodiments, the protruding section 129 lowers towards the ground plane 105. In the embodiment illustrated in FIGS. 3-6, the protruding section 129 includes a dome shape, such as a hollow spherical cap and hollow hemisphere, with the planar portion 128 at the base thereof, where the planar portion 128 includes an annular shape, such as a hollow right circular cylinder. As a minimum portion section of the radiation pattern can result due to the direction that the protruding section 129 extends, the direction of the protruding section 129 extending away from or towards the ground plane 105 may be selected based off of a direction in which a dip in the radiation pattern can be tolerated the most.

In some embodiments, a maximum height 127 of the protruding section 129 relative to the planar portion 128 is from 1/15 to 1/10 of the wavelength, such as from 3 millimeters to 5 millimeters.

In embodiments, the slot 125 extends primarily within the protruding section 129, such that the outer conductor 122 includes the planar portion 128 and outer portions of the protruding section 129, while the inner conductor 124 primarily includes an inner portion of the protruding section 129.

In the embodiment illustrated in FIGS. 3-6, the slotted patch antenna 100, including the short walls 110 and the antenna element 120, is a unitary structure that is a single structurally formed entity. In embodiments, the slotted patch antenna 100 is stamped sheet metal. In other embodiments, the slotted patch antenna 100 is cast.

In further embodiments, the slotted patch antenna 100 is integrated into a PCB. In particular, the antenna element 120 is planar and printed on a PCB. In some embodiments, the antenna element 120 is formed using traces on top of the PCB. With ground at a backside of the PCB, the short walls 110 are vias extending through the PCB to the ground. In some embodiments, the slot 125 and the perimeter are defined by printed shapes on the surface of the PCB. In some embodiments, multiple antenna elements 120 are printed on the PCB, each being connected to the ground by short walls 110 that are vias.

In yet further embodiments, the slotted patch antenna 100 is printed on a carrier with metalized plastic, such as LDS, printed metal on plastic, and a metal pattern on a flex material. The antenna element 120 and the carrier are mounted as a unit to a device.

Figure 7:
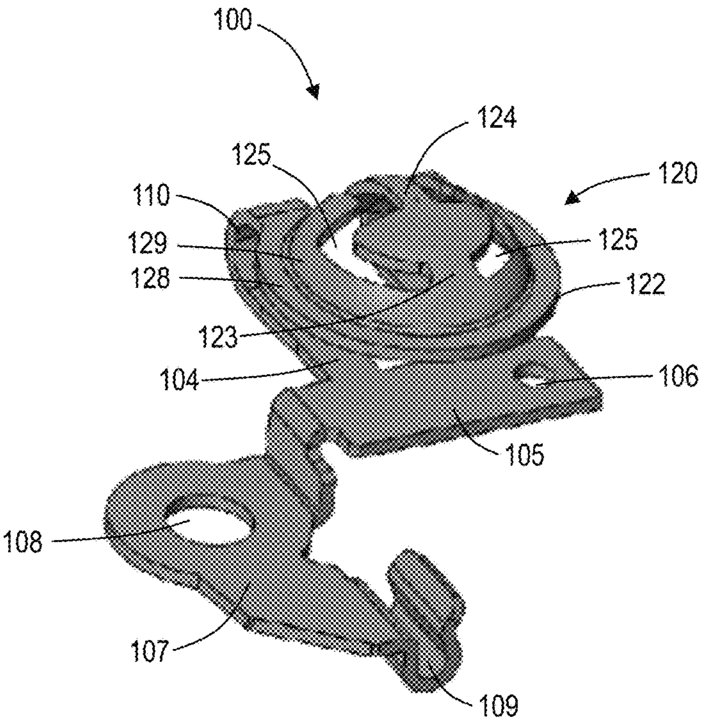
FIG. 7 is a perspective diagram of an embodiment of a single slotted patch antenna of FIGS. 3-6 connected to a mounting bracket.
Figure 8:
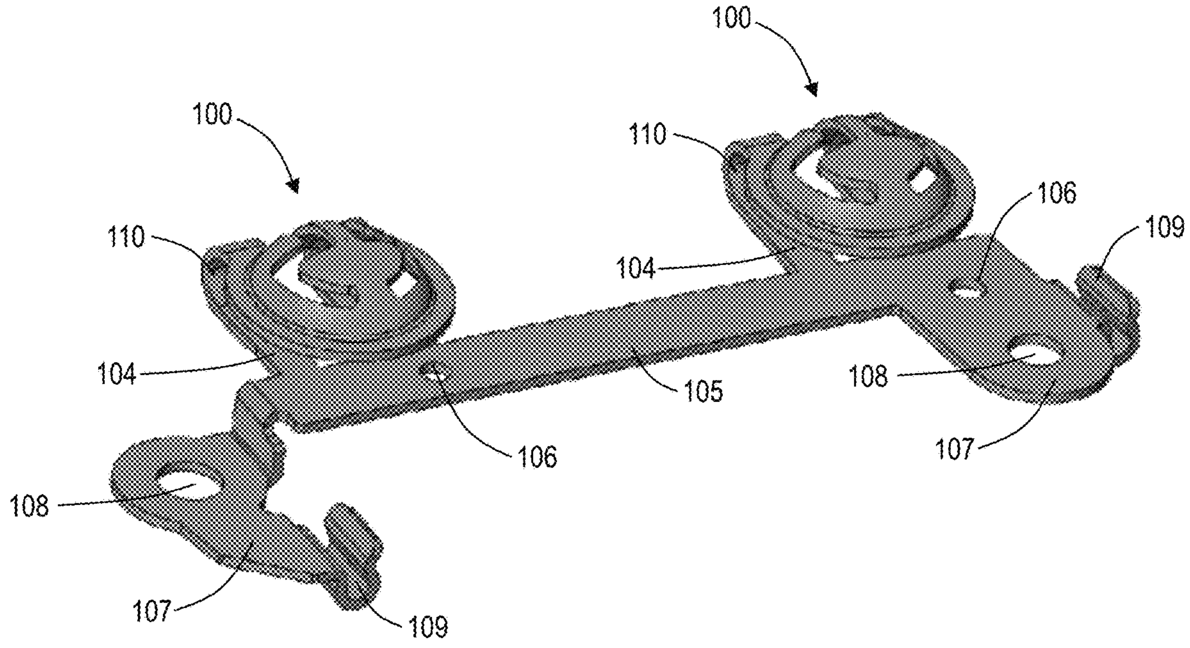
FIG. 8 is a perspective diagram of an embodiment of two slotted patch antenna of FIGS. 3-6 connected to a mounting bracket.

FIG. 7 is a perspective diagram of an embodiment of a single slotted patch antenna 100 of FIGS. 3-6 connected to a mounting bracket. FIG. 8 is a perspective diagram of an embodiment of two slotted patch antennas 100 of FIGS. 3-6 connected to a mounting bracket. Referring to FIGS. 7 and 8, one or more single slotted patch antennas 100 can be connected to a mounting bracket, where the mounting bracket is a ground plane 105.

In the embodiments illustrated in FIGS. 7 and 8, the mounting bracket includes bracket arms 104 that connect the short walls 110 to the mounting bracket. The mounting bracket also includes first bores 106 and second bores 108 for securing the mounting bracket within an electronic device. The first and second bores 106 and 108 can be formed in a body of the mounting bracket, separate bracket supports 107, and the like. In some embodiments, the mounting bracket also includes clips 109 for securing the slotted patch antennas 100 in place within the electronic device.

In embodiments with two or more slotted patch antennas 100, an angle of arrival and relative phases can be determined, and in embodiments with at least three slotted patch antennas 100, a position of an electronic device sending the signal can be determined using triangulation. The spacing between the multiple slotted patch antennas 100 is selected to work across a full range of UWB frequencies. In some embodiments, the spacing between multiple slotted patch antennas 100 is different such that good spacing for varying UWB frequencies is achieved. In embodiments with multiple slotted patch antennas 100, the antenna elements 120 are positioned within a device with known distances and angles therebetween for finding relative phases and angles of incoming signals from other devices.

Again, the structure of the slotted patch antenna 100 is formed such that two complimentary radiation sources are generated. The two complimentary radiation sources are orthogonal to each other such that the two radiation sources compensate for dips in the radiation pattern of the other radiation source to generate a more uniform overall radiation pattern of the slotted patch antenna 100.

Figure 9:
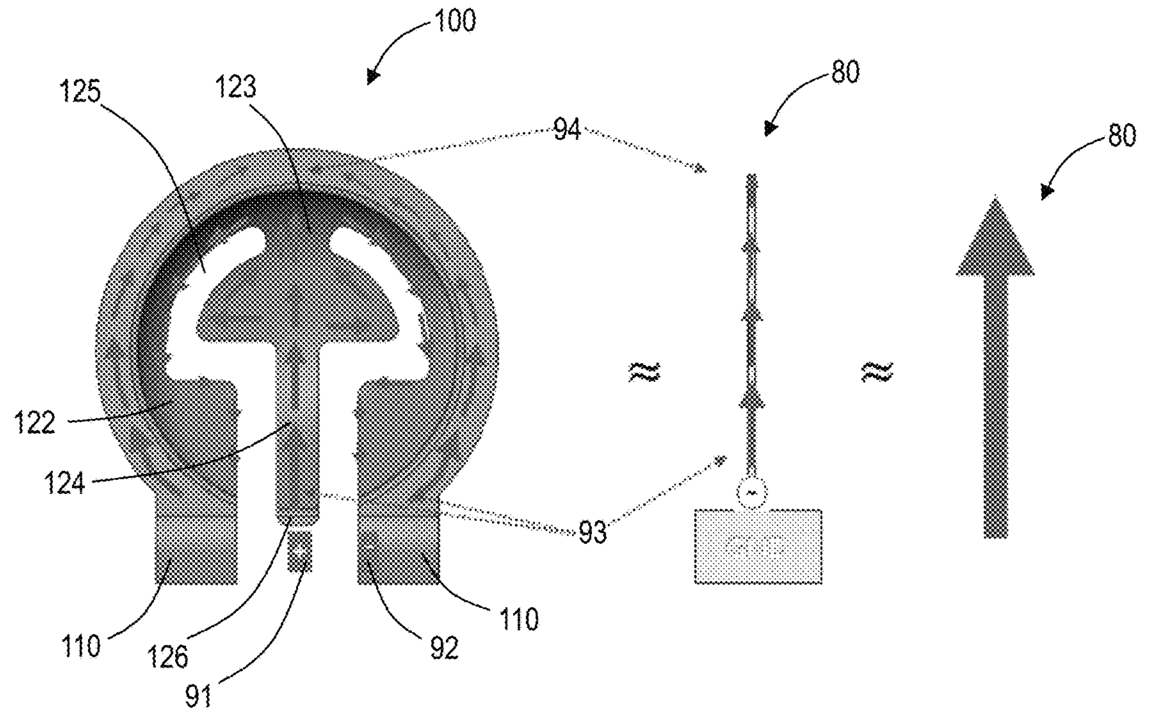
FIG. 9 is a schematic illustration and representation of the currents flowing in the slotted patch antenna of FIGS. 3-6.

FIG. 9 is a schematic illustration and representation of the currents 93, 94 flowing in the slotted patch antenna 100 of FIGS. 3-6. The current flows in FIG. 9 are illustrated with arrows where the larger arrows are the stronger electric currents. Referring to FIG. 9, most of the electric currents and the strongest electric currents flow from the electric feed 91 and ground 92 towards an opposing end of the slotted patch antenna, the opposing end including the intermediate connection 123. The strong electric currents across the inner conductor 124 and around an edge of the outer conductor 122 are a first source of radiation. As illustrated in FIG. 9, the first source of radiation flowing in a direction from the electric feed 91 and ground 92 have a similar flow to that of an electric monopole 80. Furthermore, in embodiments with a protruding section 129, such as with a domed shape, currents at the end of the inner conductor 124 and traversing the intermediate connection 123 are moving at least partially towards the ground plate 105. As the radiation patterns of monopoles and dipoles can be weak in the direction of the current flow, bending the current towards the ground tilts a weak portion of the radiation towards the ground, which results in a more uniform pattern of the overall radiation pattern.

Figure 10:
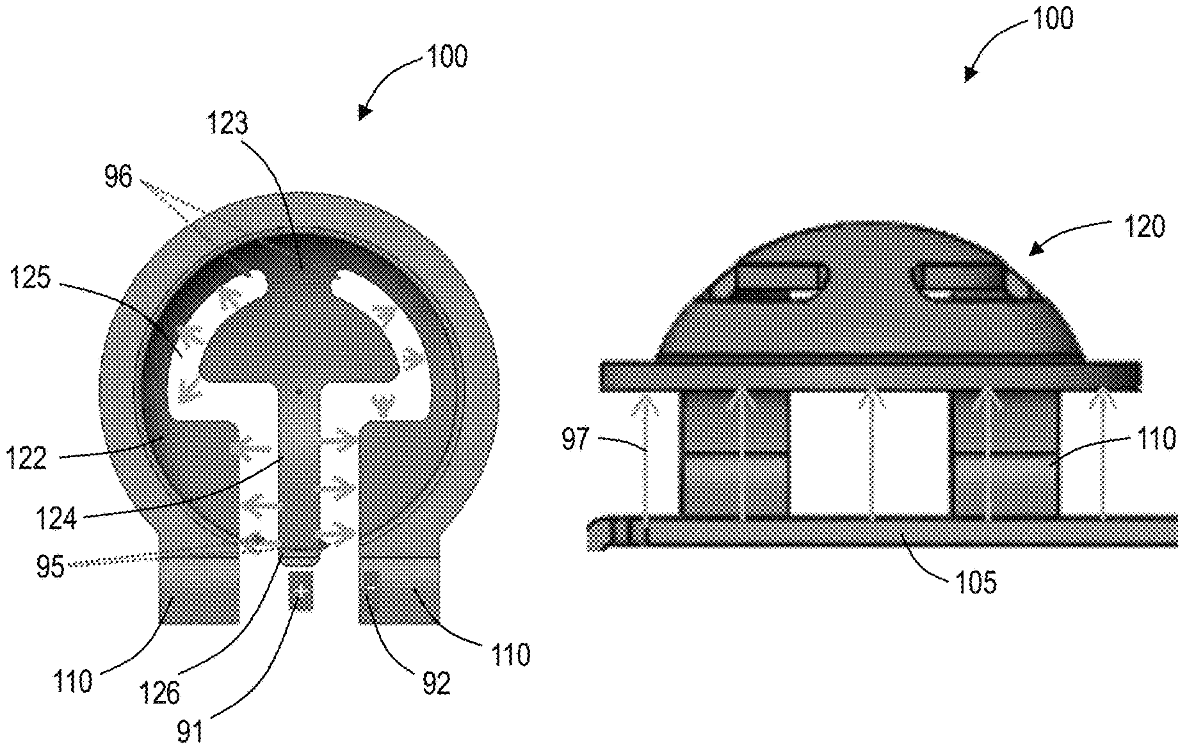
FIG. 10 is a schematic illustration and representation of the voltages of the slotted patch antenna of FIGS. 3-6.
Figure 11:
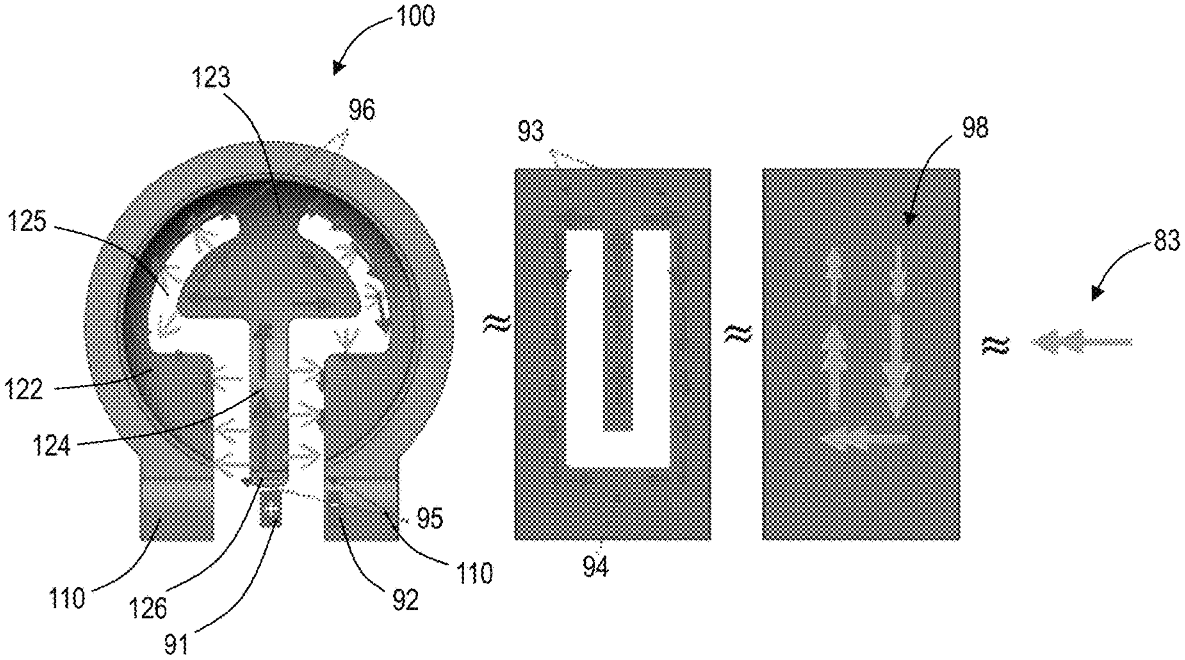
FIG. 11 is a schematic illustration and representation of the currents flowing, the voltages across the slot, and the equivalent magnetic currents of the slotted patch antenna of FIGS. 3-6.

FIG. 10 is a schematic illustration and representation of the voltages 95, 96, 97 of the slotted patch antenna of FIGS. 3-6. FIG. 11 is a schematic illustration and representation of the currents 93, 94 flowing, the voltages 95, 96 across the slot, and the equivalent magnetic currents 98 of the slotted patch antenna 100 of FIGS. 3-6. Referring to FIGS. 10 and 11, the currents 93, 94 flowing around the slot form a voltage

95, 96 across the slot 125 with the maximum voltage 95 adjoining the feed point 126, while the minimum voltage 96 adjoins the intermediate connection 123, which produces a second source of radiation. Note that a fringe field voltage 97 is also created between the ground plane 105 and the perimeter of the antenna element 120, which contributes to the radiation.

Figure 12:
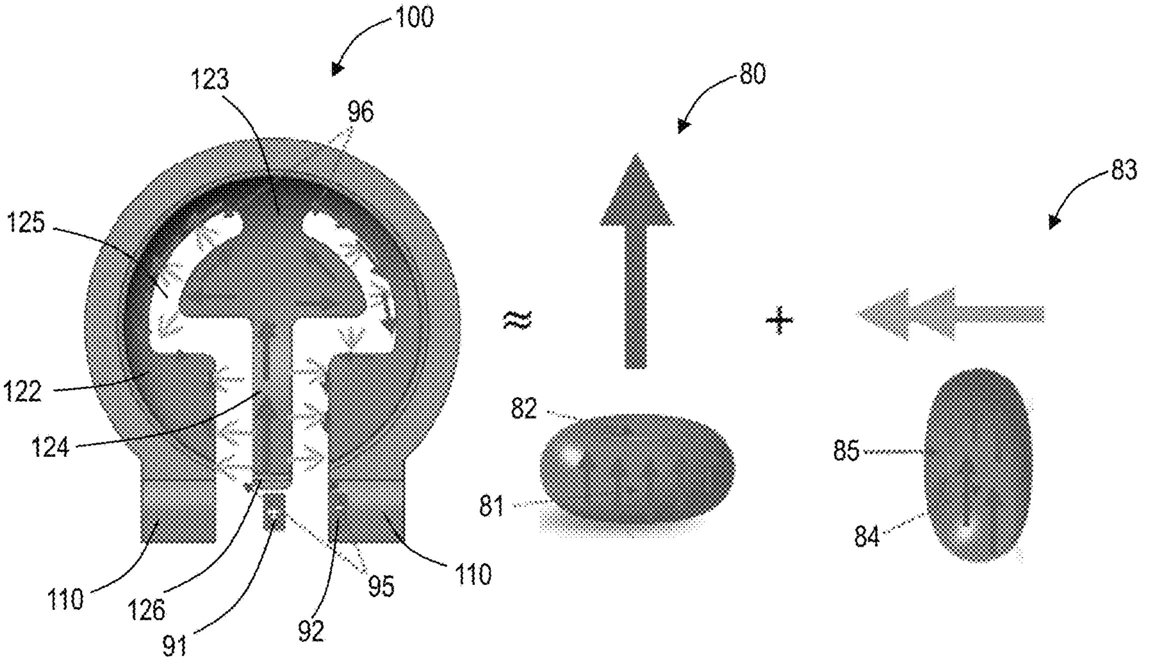
FIG. 12 is a schematic illustration and representation of the resulting radiation patterns from the currents and voltages of the slotted patch antenna of FIGS. 3-6.

With the currents 93, 94 flowing around the slot 125, an equivalent magnetic current 98 is produced that is the equivalent to a magnetic dipole 83. FIG. 12 is a schematic illustration and representation of the resulting electric fields from the approximations of the electric monopole 80 and the magnetic dipole 83 produced from the currents 93, 94 and voltages 95, 96, 97 of the slotted patch antenna 100 of FIGS. 3-6. As illustrated in FIG. 12, the approximated electric monopole 80 resulting from the electric currents flowing across the slotted patch antenna 100 has a minimum electric field 82 in the direction of the approximated electric monopole 80, with a maximum electric field orthogonal thereto. Complementarily, the approximated magnetic dipole 83 is orthogonal to the approximated electric monopole 80 and has a minimum electric field 85 in the direction thereof, and a maximum electric field 86 orthogonal thereto. Thus, the two sources are complementary due to the radiation pattern resulting from the combined electric fields that result from the orthogonal nature of the maximum electric fields 81 and 84, which results in a combined electric field that is more uniform in all angular directions.

Thus, since the inner conductor 124, the edge of the outer conductor 122, and the slot 125 each radiate, and the resulting patterns are orthogonal, the inner conductor 124 and edge of the outer conductor 122 compensate for the dips in the radiation pattern produced by the slot 125 and vice versa.

Figure 13:
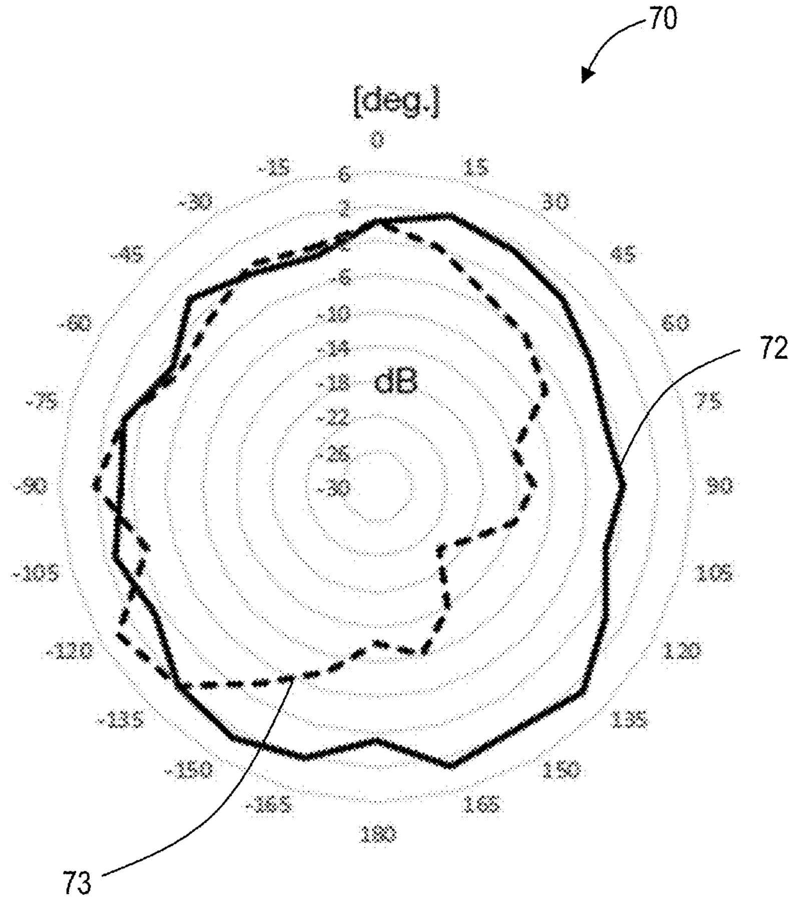
FIG. 13 is a polar plot illustrating a comparison of a radiation pattern for an embodiment of the slotted patch antenna and a radiation pattern for a classical IFA antenna.
Figure 14:
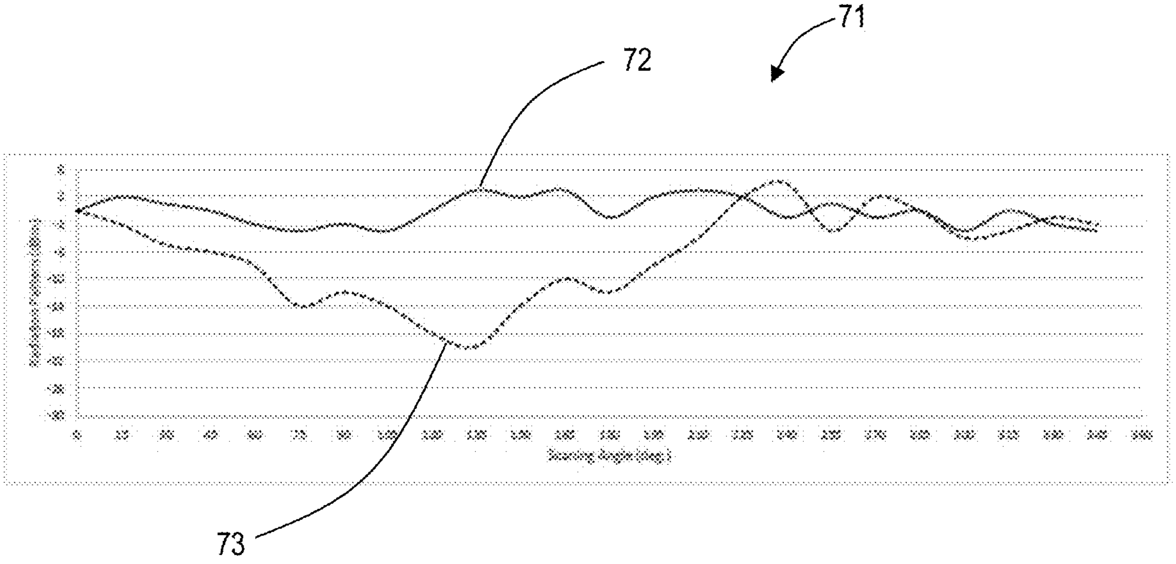
FIG. 14 is a Cartesian plot of the comparison of FIG. 13.

FIG. 13 is a polar plot 70 illustrating a comparison of a radiation pattern 72 for an embodiment of the slotted patch antenna 100 and a radiation pattern 73 for a classical IFA antenna. FIG. 14 is a Cartesian plot 71 of the comparison of FIG. 13. As shown in FIGS. 13 and 14, the radiation pattern 72 for the embodiment of the slotted patch antenna 100 has a generally uniform radiation pattern with a variation range that is only about 6 dB. In contrast, the classical IFA antenna has a non-uniform radiation pattern with a variation range that is significantly larger, at about 20 dB.

With a generally uniform pattern in all angular directions, such as the radiation pattern 72 illustrated in FIGS. 13 and 14, a more accurate determination of a distance a device is from an electronic device with one or more slotted patch antennas and a more accurate determination of whether a device (and therefore the user) is moving towards or moving away from the electronic device that includes the one or more slotted patch antennas 100, no matter the angular direction is achievable. Further, with multiple slotted patch antennas 100, triangulation can be used to track a device within range thereof. Such tracking can be used to track the location of the device, movement of the device, identify devices that are coming/going from the location, and the like. Indeed, the more uniform the radiation pattern, the more accurately each of the above can be determined. Such tracking can be used for wellness, such as ensuring the elderly is moving, not on the floor (such as detecting that the device is on the floor) and still at the location, energy management (based on a number of devices detected and the location of those devices), and security, such as turning alarms on/off, detecting whether an unknown person is approaching, identifying the person approaching, which direction a person is approaching from, and the like.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An antenna system comprising an antenna element including:

an outer conductor forming a perimeter of the antenna element; and an inner conductor physically and electrically connected to the outer conductor only at an intermediate connection at an inner portion of the outer conductor, the inner conductor extending from the intermediate connection to a feed point adapted to receive an electrical connection distal to the intermediate connection, wherein the outer conductor and the inner conductor are arranged to form a slot therebetween, and the slot extends around the inner conductor such that each end of the slot is adjacent to the intermediate connection;

a mounting bracket adapted to be a ground plane; and short walls physically and electrically connecting the outer conductor to the mounting bracket, each short wall connecting to an end of the outer conductor adjacent to the feed point.

2. The antenna system of claim 1, wherein the inner conductor is adapted to approximate an electric monopole and the outer conductor and the inner conductor are adapted to generate a voltage across the slot that approximates a magnetic dipole that is orthogonal to the approximated electric monopole.

3. The antenna system of claim 1, wherein the antenna element, including the outer conductor and the inner conductor, the short walls, and the mounting bracket are formed of a unitary structure by one of stamping and casting.

4. The antenna system of claim 1, further comprising a second antenna element physically and electrically connected to the mounting bracket by second short walls.

5. The antenna system of claim 4, wherein the antenna element, the short walls, the mounting bracket and the second antenna element are formed of a unitary structure by one of stamping and casting.

6. The antenna system of claim 1, wherein the antenna element further includes a planar portion that at least forms the perimeter of the antenna element, and a protruding section that protrudes from the planar portion, and wherein the feed point is adapted to be angled towards a ground plane due to a shape of the protruding section.

7. The antenna system of claim 1, wherein the antenna element is planar and printed on a Printed Circuit Board (PCB).

8. The antenna system of claim 1, wherein the slot and the perimeter are defined by printed shapes on a surface of a Printed Circuit Board (PCB).

9. The antenna system of claim 2, wherein the short walls are vias extending through a Printed Circuit Board (PCB) to a ground.

10. The antenna system of claim 1, comprising a plurality of the antenna element positioned within a device with known distances and angles therebetween for finding relative phases and angles of incoming signals from other devices.

11. The antenna system of claim 1, wherein the antenna element is printed using metalized plastic on a carrier, and wherein the antenna element and the carrier are mounted as a unit to a device.

12. An electronic device comprising circuitry communicatively coupled to an antenna element, wherein the antenna element includes:

an outer conductor forming a perimeter of the antenna element; and an inner conductor physically and electrically connected to the outer conductor only at an intermediate connection at an inner portion of the outer conductor, the inner conductor extending from the intermediate connection to a feed point adapted to receive an electrical connection distal to the intermediate connection, wherein the outer conductor and the inner conductor are arranged to form a slot therebetween, and the slot extends around the inner conductor such that each end of the slot is adjacent to the intermediate connection;

a mounting bracket adapted to be a ground plane; and short walls physically and electrically connecting the outer conductor to the mounting bracket, each short wall connecting to an end of the outer conductor adjacent to the feed point.

13. The electronic device of claim 12, wherein the inner conductor is adapted to approximate an electric monopole and the outer conductor and the inner conductor are adapted to generate a voltage across the slot that approximates a magnetic dipole that is orthogonal to the approximated electric monopole.

14. The electronic device of claim 12, wherein the antenna element, including the outer conductor and the inner conductor, the short walls, and the mounting bracket are formed of a unitary structure by one of stamping and casting.

15. The electronic device of claim 12, further comprising a second antenna element physically and electrically connected to the mounting bracket by second short walls.

16. The electronic device of claim 15, wherein the antenna element, the short walls, the mounting bracket and the second antenna element are formed of a unitary structure by one of stamping and casting.

17. The electronic device of claim 12, wherein the antenna element further includes a planar portion that at least forms the perimeter of the antenna element, and a protruding section that protrudes from the planar portion, and wherein the feed point is adapted to be angled towards a ground plane due to a shape of the protruding section.

18. The electronic device of claim 13, wherein the short walls are vias extending through a Printed Circuit Board (PCB) to a ground.

19. The electronic device of claim 12, comprising a plurality of the antenna element positioned within a device with known distances and angles therebetween for finding relative phases and angles of incoming signals from other devices.

20. The electronic device of claim 12, wherein the antenna element is printed using metalized plastic on a carrier, and wherein the antenna element and the carrier are mounted as a unit to a device.

* * * * *